United States Patent [19]

Burkard

[11] Patent Number: 4,948,647

[45] Date of Patent: Aug. 14, 1990

[54] GYPSUM BACKER BOARD

[75] Inventor: Edward A. Burkard, East Amherst, N.Y.

[73] Assignee: National Gypsum Company, Dallas, Tex.

[21] Appl. No.: 308,922

[22] Filed: Feb. 13, 1989

[51] Int. Cl.$^5$ .......................... B32B 3/04; B32B 5/14; B32B 13/02; B32B 33/00
[52] U.S. Cl. ....................................... 428/70; 156/41; 156/42; 428/247; 428/703
[58] Field of Search ...................... 156/41, 42; 428/70, 428/247

[56] References Cited

U.S. PATENT DOCUMENTS 4,378,405 3/1983 Pilgrim ................................ 156/42
4,504,533 3/1985 Altenhofer et al. ................. 428/70

Primary Examiner—James C. Cannon
Attorney, Agent, or Firm—Laird F. Miller; Robert F. Hause

[57] ABSTRACT

A backer board for use as a base to which ceramic tile is bonded for a bathtub or shower area, in which the board is made by forming a gypsum core board with fiber glass laminated composite facings, which include an inner fiber glass scrim, an outer fiber glass nonwoven matte and an acrylic film, which film is formed of an acrylic latex of a class commonly employed as an ingredient in Portland cement mortar for applying ceramic tile.

18 Claims, 2 Drawing Sheets

GYPSUM BACKER BOARD

BACKGROUND OF THE INVENTION

This invention relates to a novel gypsum board and particularly to a backer board for wet areas, such as behind ceramic tile in bathtub and shower areas U.S. Pat. No. 4,647,496 discloses a fibrous mat-faced gypsum support surface in the exterior structure of a building with insulating material adhered thereover and an exterior finishing material which may be an acrylic resin based composition or a Portland cement stucco. Woven glass cloth, glass fiber scrim or a glass fiber mesh may be embedded in the exterior finishing material, or between the insulating material and the exterior finishing material as a reinforcing component. The fibrous mat-faced gypsum support surface is preferably a set gypsum core faced with a fibrous mat. The mat can comprise continuous or discrete strands of fibers and be woven or nonwoven, but preferably it is fiber glass filaments oriented in random pattern, bound together with a resin binder, and preferably on both surfaces of the core.

Canadian Pat. No. 993,779 also discloses a gypsum core board with facings formed of woven or unwoven porous glass fiber cover sheets, the woven normally being found more expensive.

U.S. Pat. No. 3,312,585 discloses a gypsum board for use as a backer board for behind ceramic tile in wet areas, formed of a paper covered gypsum core, plus a water impervious film, such as of polyvinyl chloride, covering the front face of the board and at least one longitudinal edge.

SUMMARY OF THE INVENTION

The present invention provides a novel water resistant gypsum board having on at least one face a laminated composite facing of an outer nonwoven fiber matte, and an inner woven, or at least semi-woven, fiber scrim, the fibers of both layers being preferably glass fiber.

The two plies of the composite facings are laminated and bonded together prior to the formation of the gypsum board. Following the formation of the gypsum board, the fibrous laminated composite facing on the front face of the gypsum board, which is most likely to be subjected to water, is coated with a water-based latex coating, preferably an acrylic latex coating.

In the preferred embodiment, the gypsum core includes, within its composition, water repellent chemicals, such as emulsions of asphalt and wax.

It is an object of the invention to provide an improved gypsum board in respect to its ability to withstand the dampness which often exists on the face of a board to which ceramic tile is applied, in both tub and shower areas, or the like, and its ability to have ceramic tile bonded thereto with a resultant extra strong bond.

It is a further object to provide a fiber glass faced gypsum board having markedly improved strength and visual appearance as a result of the novel placement of an outer layer of randomly directed, discontinuous fibers in a porous felted fiber form, over an inner layer of continuous long fibers in a woven or semi-woven form, in a multi-layer, latex coated facing on a gypsum board.

It is a still further object of the invention to combine such facings on a gypsum core, of a water repellent composition, to form a board over which ceramic tile are applied to provide an improved wet area wall.

BRIEF DESCRIPTION OF THE DRAWINGS

These and other objects and advantages of the invention will be more readily apparent when considered in relation to the preferred embodiments, as set forth in the specification, and shown in the drawings, in which.

DESCRIPTION OF THE PREFERRED EMBODIMENTS

Figure 1:
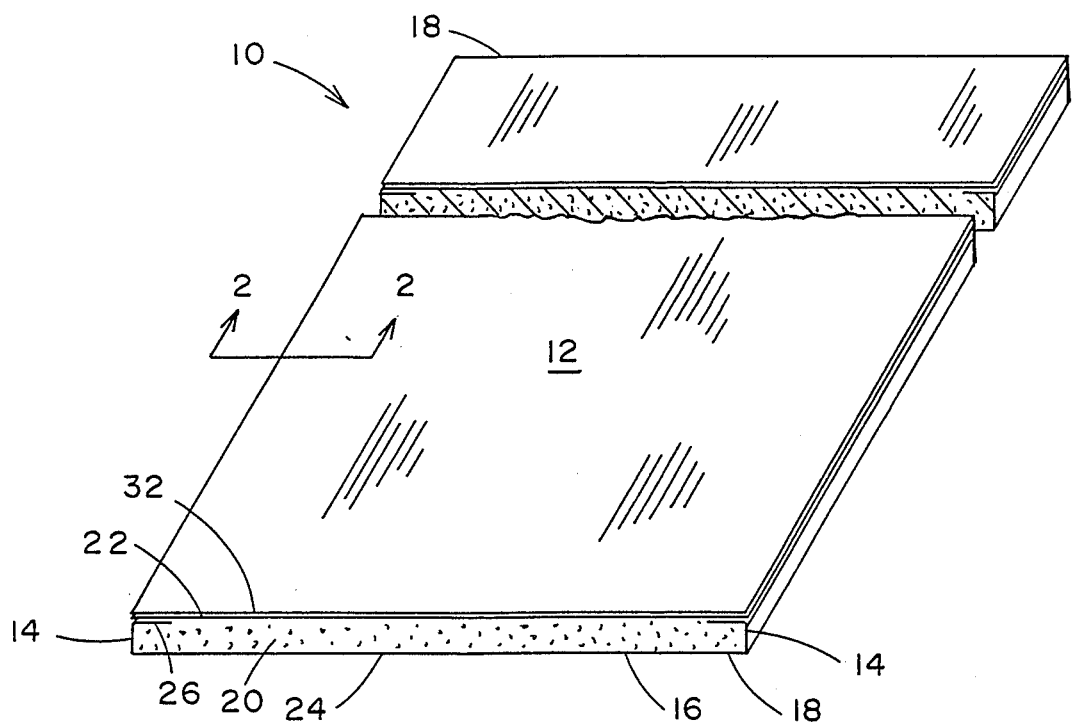
FIG. 1 is an isometric view of a gypsum board, made in accordance with the present invention.

Referring to the drawings, there is shown a gypsum board 10, having a front face 12, two side edges 14, a back face 16 and two ends 18. The gypsum board 10 is formed of a gypsum core 20, enclosed within a front face laminated composite facing 22 and a back face laminated composite facing 24.

The front face composite facing 22 extends entirely throughout the extend of front face 12. The back face composite facing 24 extends throughout all of the back face 16 with only one layer of the composite facing 24 extending around each of the two side edges 14 and a short distance onto the front face 12 adjacent to each side edge 14. The front face composite facing 22, adjacent each side edge 14, overlaps the part of the back face composite facing 24 disposed thereat, forming a lapped joint 26 of the two composite facings 22, 24.

The gypsum core 20 preferably includes water repellent additives, such as asphalt and wax which were added during manufacture of the gypsum board, in the form of a 10% by weight asphalt-wax emulsion, and about ½% by weight polyvinyl alcohol.

The front face laminated composite facing 22 and the back face laminated composite facing 24 are both about 0.020 inch thick, formed essentially of two plies, preferably an inner semi-woven glass fiber scrim 28 and an outer nonwoven fiber glass matte 30. The scrim weight is about 11.3 pounds per thousand square feet and the matte weight is about 16.5 pounds per thousand square feet.

The front face laminated composite facing 22 has formed thereon a thin acrylic film 32 which is the product of an application of an acrylic latex to the front face 12 just before severing of the continuously formed web of gypsum board into separate gypsum boards 10, and thus prior to drying of the gypsum boards 10, permitting curing of the film 32 during drying of the gypsum core 20.

The acrylic latex which is applied is preferably a water dispersion of an acrylic polymer specifically designed for modifying Portland cement compositions, such as a Rohm and Haas Company additive identified by the trademark Rhoplex E-330. This particular aqueous acrylic emulsion is a white, milky liquid, of 47% solids, a 9.5 to 10.5 pH, a 50 cps maximum viscosity, a specific gravity of between 1 and 1.2, with freeze thaw stability to 5 cycles and a minimum film formation temperature of 10° to 12° C. It contains a maximum of 0.2% ammonia.

By employing an acrylic polymer, to form film 32, which is specifically one which is the same as that used in modifying Portland cement compositions, the film 32 is caused to be substantially better in respect to its ability to bond to resin enhanced mortars used for applying ceramic tile.

The acrylic latex is applied using two vinyl rolls covered with a cloth sleeve, which apply 12–14 pounds of solids per thousand square feet of gypsum board.

The acrylic latex penetrates completely through the very porous front face laminated composite facing 22 and on into the gypsum core, which still contains considerable excess water at the time the latex is applied, strengthening the core 20 in that portion of the core 20, which is most important in providing high shear values that contribute to bonding ceramic tile to the gypsum board. The acrylic latex also adds additional water resistance to the gypsum core.

Figure 2:
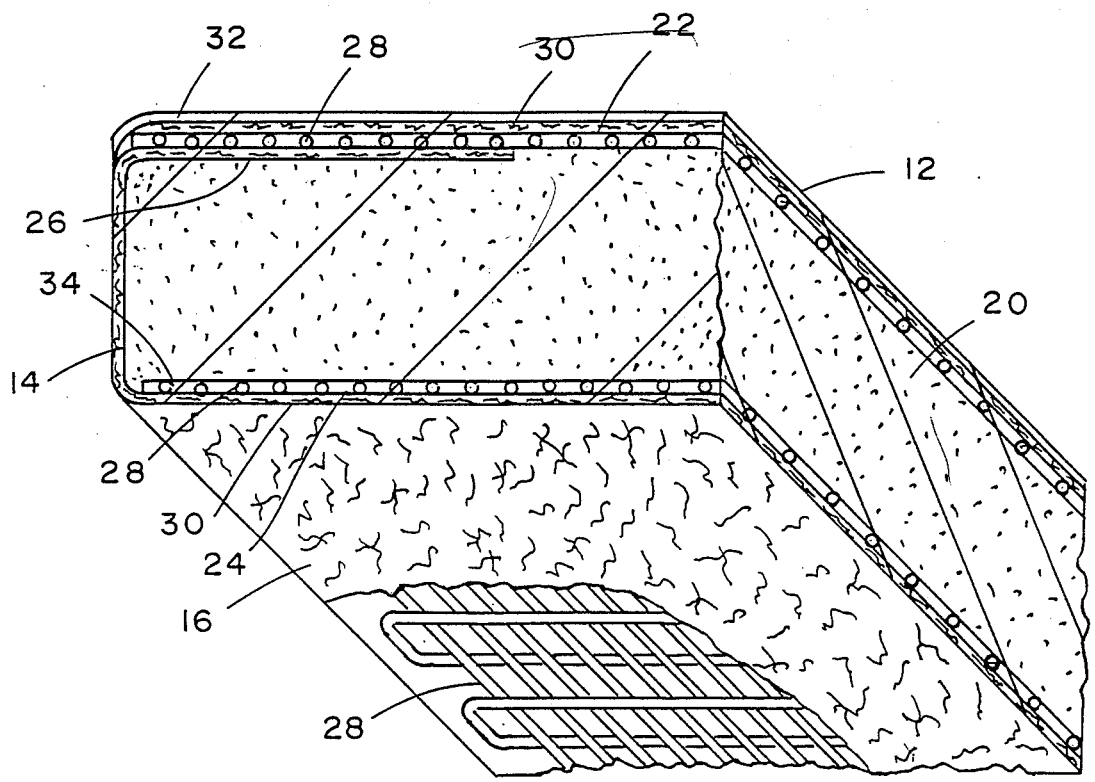
FIG. 2 is an enlarged cross-sectional isometric view of the edge portion of the gypsum board of FIG. 1, taken on line 2—2 thereof.
Figure 3:
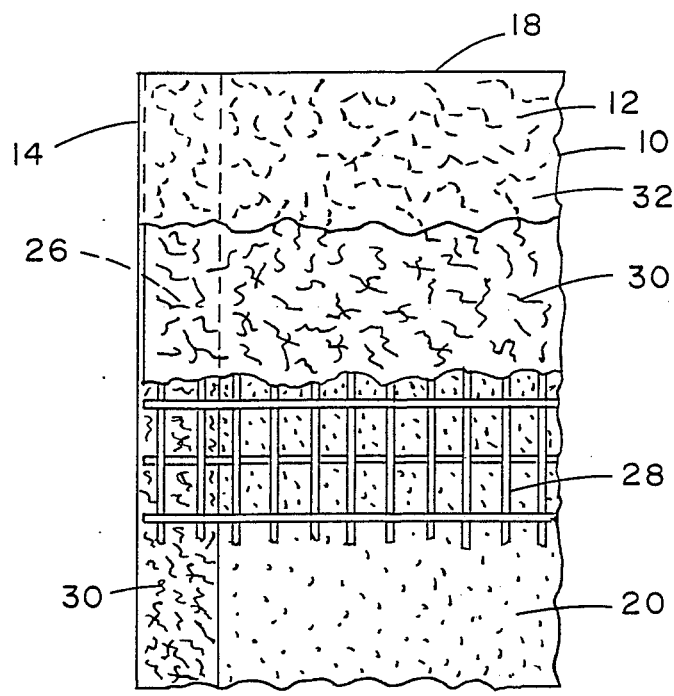
FIG. 3 is a face view of the top surface of the gypsum board of FIG. 1, coated with an acrylic latex, portions broken away showing the preferred semi-woven glass fiber inner layer continuous strands behind a nonwoven random, discontinuous glass fiber outer surface, formed of felted, random, discontinuous glass fibers, and overlapping the wrapped around edge of the back face felted fiber layer.

The portion of the back face laminated composite facing 24 which extends around each of the two side edges 14 and a short distance onto the front face 12, preferably consists solely of the outer nonwoven fiber glass matte 30. The side edge 34 of the semi-woven glass fiber scrim 28 of the back facing 24 will be seen in FIG. 2 to be located at the side edge 14 of the gypsum board back face 16. By omitting the scrim 28 of back facing 24 from the portion which extends around edges 14 and onto front face 12, manufacturing processes, particularly the severing of the formed board into separate gypsum boards 10, is made easier and with less energy and less potential damage to the end product.

The semi-woven glass fiber scrim 28 has preferably a fiber count of 6 fibers/inch in the cross machine direction and 10 fibers/inch in the machine direction. The tensile strength in the cross machine direction is 122 pounds per inch, and in the machine direction is 107 pounds per inch.

The laminated composite facings 22, 24 are available, prebonded as a unitary two-ply composite from the Milliken Corporation.

During formation of the gypsum board 10, the lapped joint 26 is formed with a polyvinyl acetate based adhesive. A suitable adhesive for the lapped joint 26 is a product of L. D. Davis Industries Inc., sold under the trademark Product No. 259.

It is important, during formation of the gypsum board, that the gypsum core slurry be of a uniform consistency which results in a minimum but sufficient penetration of the core slurry into the composite facings, to provide thorough adhesion of the facings to the core without any substantial bleed-through of the core mix to the outer surface of the composite facings.

The above described gypsum board, produced by the method steps as described above, has outstanding resistance to deterioration by water that may penetrate through a layer of ceramic tile applied thereto using resin reinforced mortar, in addition to having superior bond between the ceramic tile and the gypsum board 10.

Figure 4:
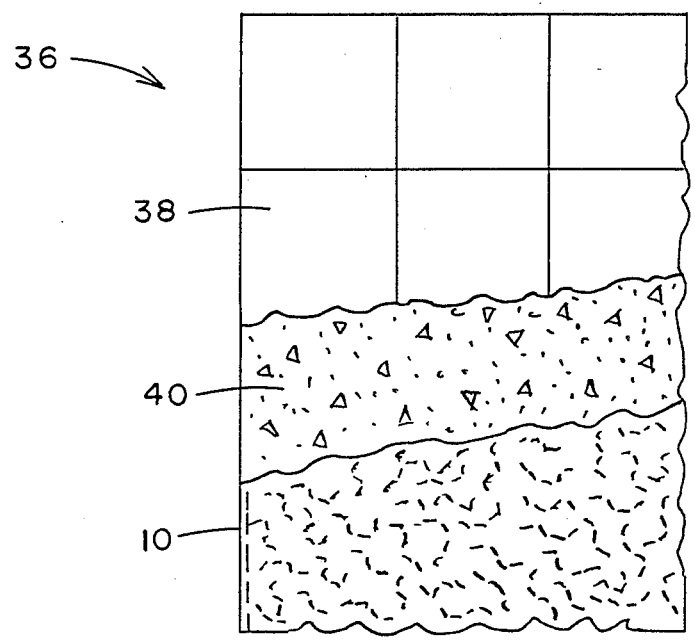
FIG. 4 is a face view of a ceramic tile wall intended for a bathtub, shower or other wet area, with portions broken away, showing the gypsum board of FIG. 3, covered with resin reinforced Portland cement mortar, covered with ceramic tile.

FIG. 4 shows a wet area wall 36, with ceramic tiles 38 bonded to a gypsum board 10, with a resin reinforced Portland cement mortar 40. The resin reinforced Portland cement mortar 40 was made incorporating a resin which is similar to the resin of the gypsum board film 32, preferably both being acrylic resins.

Having completed a detailed description of the preferred embodiments of my invention, so that others may practice the same, I contemplate that variations may be made without departing from the essence of the invention.

I claim:

1. A gypsum board, for use in wet areas for application thereto of ceramic tile, said board comprising a set gypsum core, a front face with facing material thereon and a back face with facing material thereon, said facing material on at least said front face being a mineral fiber laminated composite facing, said composite facing including two plies, said two plies consisting of a woven mineral fiber scrim adhered to said gypsum core and a nonwoven mineral fiber matte disposed outward of said scrim, said outwardly disposed matte on said front face having a water based latex-provided film receptive to bonding with resin-enhanced mortars used to apply ceramic tile formed thereon.

2. A gypsum board as defined in claim 1 wherein said mineral fiber is glass fiber.

3. A gypsum board as defined in claim 2 wherein said facing material on both said faces is said glass fiber laminated composite facing.

4. A gypsum board as defined in claim 3 wherein said glass fiber laminated composite facing on said back face extends around side edges on said board and onto said front face whereat said front face laminated composite facing and said back face laminated composite facing form lapped joints.

5. A gypsum board as defined in claim 4 wherein said back face laminated composite facing includes said two plies only on said back face with only said nonwoven glass fiber matte ply extending around said side edges and onto said front face.

6. A gypsum board as defined in claim 1 wherein said gypsum core contains a minor percentage of water repellent chemicals.

7. A gypsum board as defined in claim 1 wherein said outwardly disposed matte has an acrylic film thereon.

8. A gypsum board as defined in claim 7 wherein said film is formed of a resin which is specifically formulated for use as a Portland cement additive.

9. A wet area wall structure comprising a gypsum board as defined in claim 1 and a plurality of ceramic tiles adhered to said gypsum board by a layer of resin reinforced mortar.

10. A wet area wall structure as defined in claim 9 wherein said mineral fiber is glass fiber.

11. A wet area wall structure as defined in claim 10 wherein said gypsum core contains a minor percentage of water repellent chemicals.

12. A wet area wall structure as defined in claim 11 wherein said film is a resin similar to said resin of said resin reinforced mortar.

13. A wet area wall structure as defined in claim 12 wherein said resin is an acrylic.

14. The method of making a gypsum board for use in wet areas comprising the steps of laminating a ply of glass fiber scrim to a ply of a nonwoven glass fiber matte, forming a gypsum slurry containing water repellent additives into board form with said laminated glass fiber composite forming a front face facing for said gypsum board, bonding said glass fiber composite to said gypsum core by causing said gypsum slurry to penetrate into said ply of glass fiber scrim of said glass fiber composite, allowing said gypsum slurry to at least partially set, applying a resin film to a front face of said at least partially set gypsum board, severing said coated gypsum board into predetermined lengths, and drying said gypsum boards.

15. The method of claim 14 wherein said gypsum board is formed with said laminated glass fiber composite forming the facings of said gypsum board on both a front side and a back side of said gypsum board.

16. The method of claim 15 wherein said laminated glass fiber composite on said gypsum board back side has side edge portions of solely said nonwoven glass fiber matte, said side edge portions being folded over each side edge of said gypsum core and extending to said front side and adjoined to said laminated glass fiber composite on said front side.

17. The method of claim 14 wherein said resin film consists of a resin specifically formulated for use as a Portland cement additive.

18. The method of claim 17 wherein said resin is an acrylic resin.

* * * * *

UNITED STATES PATENT AND TRADEMARK OFFICE
CERTIFICATE OF CORRECTION

PATENT NO. : 4,948,647
DATED : August 14, 1990
INVENTOR(S) : Edward A. Burkard

It is certified that error appears in the above-identified patent and that said Letters Patent are hereby corrected as shown below:

In the claims    Column 4, line 59:

Correct the dependency of claim 12 by deleting "11" and substituting --9-- therefore.

Signed and Sealed this

Sixth Day of August, 1991

Attest:

HARRY F. MANBECK, JR.

Attesting Officer    Commissioner of Patents and Trademarks